United States Patent [19]

Oppenheimer et al.

[11] 4,287,947
[45] Sep. 8, 1981

[54] SOLAR PANEL ELEMENTS AND METHOD OF MANUFACTURE THEREOF

[75] Inventors: Edgar D. Oppenheimer, Mamaroneck, N.Y.; Humfrey N. Udall, Darien; Wallace C. Rudd, New Canaan, both of Conn.

[73] Assignee: Thermatool Corp., Stamford, Conn.

[21] Appl. No.: 142,966

[22] Filed: Apr. 23, 1980

[51] Int. Cl.³ ............................................. F28F 1/20
[52] U.S. Cl. .............................. 165/183; 29/157.3 C; 126/446
[58] Field of Search ................. 113/118 C; 165/171, 165/183; 29/157.3 C; 126/446

[56] References Cited

U.S. PATENT DOCUMENTS

| | | | |
|---|---|---|---|
| 2,261,137 | 11/1941 | Brown, Jr. | 165/183 |
| 2,809,276 | 10/1957 | Smith | 165/171 |
| 4,136,272 | 1/1979 | Rudd | 165/183 X |

FOREIGN PATENT DOCUMENTS

| | | | |
|---|---|---|---|
| 595216 | 3/1960 | Canada | 165/183 |
| 1015904 | 10/1952 | France | 165/183 |
| 1015925 | 10/1952 | France | 165/183 |

OTHER PUBLICATIONS

Haga et al., Welding Phenomena and Welding Mechanisms in High-Frequency Electric Resistance Haga et al., Welding Study on ERW, Nippon Steel Corporation, American Welding Society, 1979.
Haga et al., The Mechanism of Formation of Weld Defects in High-Frequency Welding Study on ERW, Nippon Steel Corporation, American Welding Society, 1979.

*Primary Examiner*—Sheldon J. Richter
*Attorney, Agent, or Firm*—Brooks, Haidt, Haffner & Delahunty

[57] ABSTRACT

Heat exchanger elements, particularly for solar panels, comprising metal tubing secured to a metal strip which is wider than the tubing and relatively thin by a weld which is metal of at least one of the tubing and the strip which has melted and cooled, the welding conditions being selected so that molten metal is expelled from between the tubing and the strip at the ends of short intervals and the strength of the weld varies longitudinally of the tubing. High frequency electric welding is used under conditions which cause the expulsion of the molten metal.

3 Claims, 6 Drawing Figures

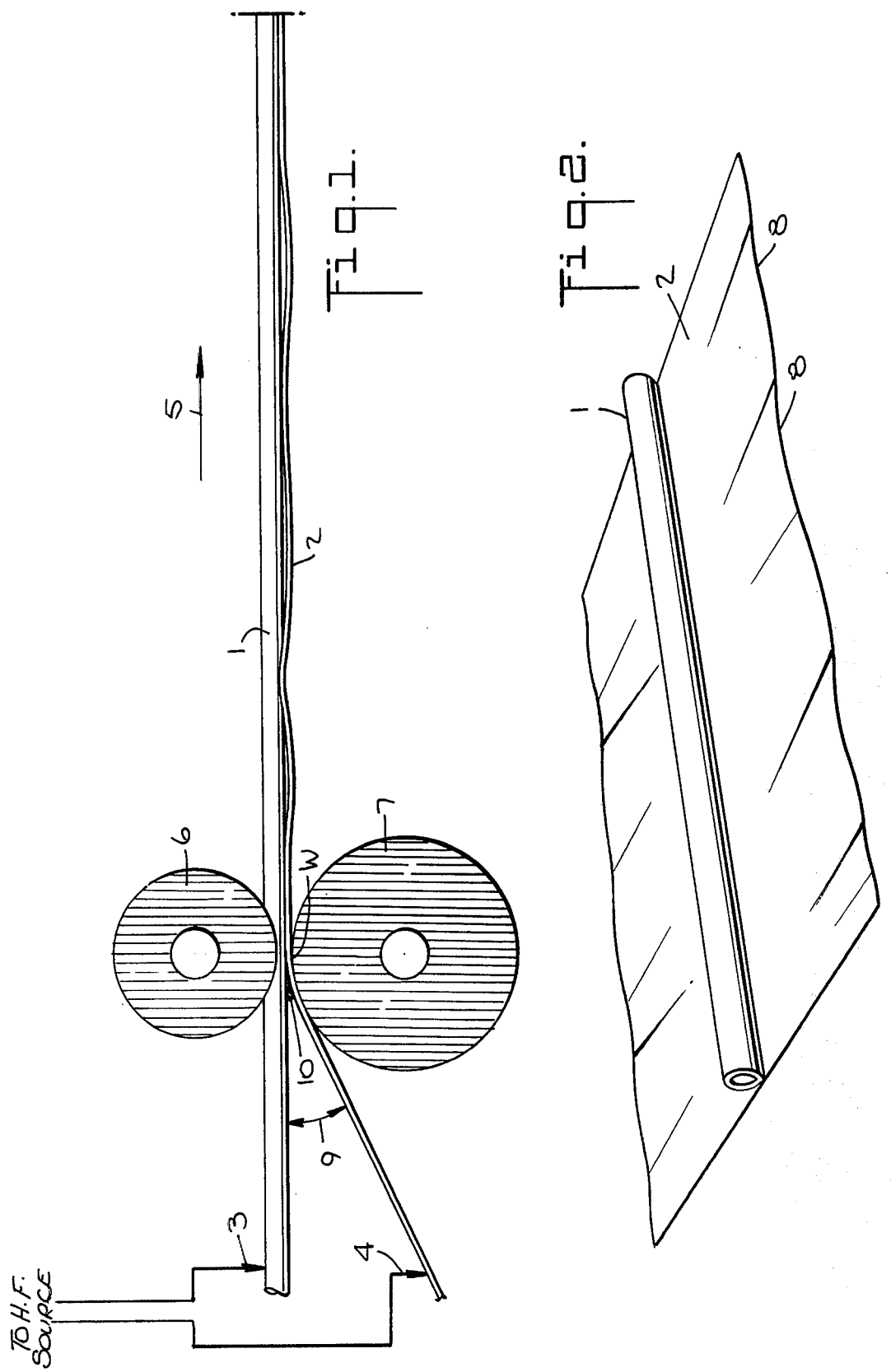

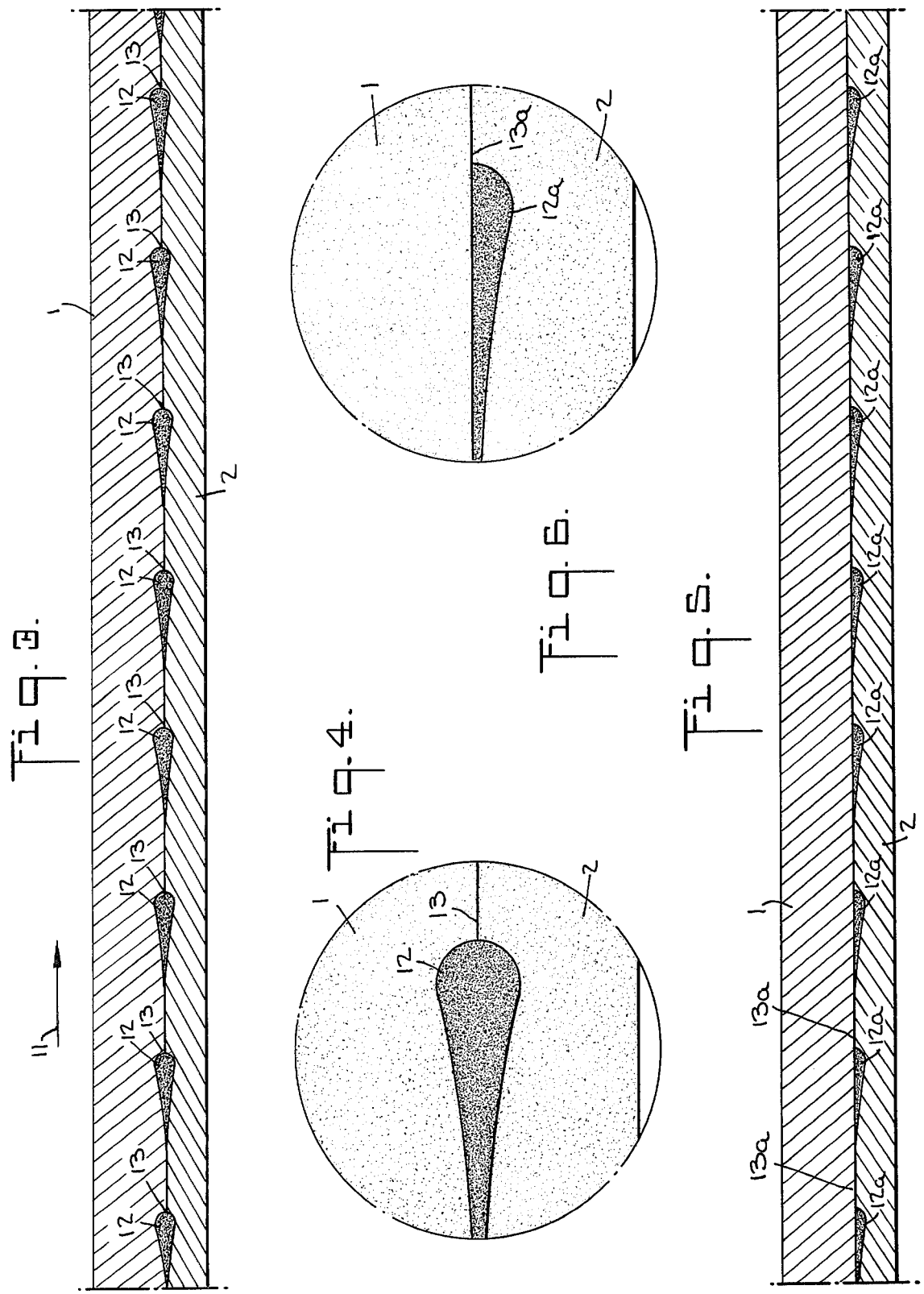

SOLAR PANEL ELEMENTS AND METHOD OF MANUFACTURE THEREOF

This invention relates to heat exchanger elements of the type comprising metal tubing welded to a relatively thin and wide metal strip and relates particularly to elements of such type which are used as part of solar panels.

Panels of the type to which the invention relates and the manufacture thereof are illustrated and described in the U.S. Pat. No. 4,136,272. In the methods described in U.S. Pat. No. 4,136,272, high frequency welding techniques are used for joining the tubing and the metal sheet or strip, and several of the individual elements, each comprising a single tube joined to a strip, are placed side-by-side and joined to headers by solder.

The strip is employed in a heat exchanger element for a solar panel to increase the heat collecting area over the area present when tubing alone is used. A heat absorbing fluid is circulated through the tubing, and the tubing need not be large in order to convey the fluid at a rate sufficient to remove the heat from the strip and the tubing.

While the tubing must be fluid-tight, it is not necessary that the bond or weld between the tubing and the strip be impenetrable by fluids. Instead, the main object of the weld is to provide a low resistance heat flow path between the tubing and the strip. Due to the temperature variations to which the panel elements are subjected, the weld between the tubing and the strip is subjected, during use, to substantial stress and strains which can cause cracking or tearing at the joint between the tubing and the strip when the weld has been produced by molten metal of the tubing or the strip or both.

Generally, three modes of weld joint failure have been observed to result from tube-to-strip forces. Tensile or shear failure can occur on the tube-to-strip bond plane in the case of weak metallurgical bonding at the interface. Where good metallurgical bonding has occurred but the weld width is small with respect to both the tube wall and strip thickness, failure normally occurs at a shallow depth parallel to the bond plane within either the tube wall or strip, whichever material is weaker. When good metallurgical bonding has occurred and the weld is wide with respect to either the tube wall or the strip, failure will usually occur in the thinner of the two as through-the-wall shearing on both sides of the bond plane. The fracture energy in the case of poor bonding is small and the joint fails easily. The fracture energy in the case of shallow failure in the narrow welded joint is greater than for a poor bond but much less than that for a wider weld which fails in double shear.

Wide welds are obviously desirable from a strength viewpoint. For efficient heat transfer, a weld of rapidly varying width which averages approximately twice the thickness of the thinner of the tube wall or strip is normally adequate.

Uniform wide welds are difficult to produce in thin-wall tube-to-strip joints because of the physical weakness of the parts; however, a weld of greatly varying width and adequate average width can be produced without excessive forces.

The advantage of a weld of greatly varying width over a uniform weld of the same average width lies in its greater resistance to failure. If failure should start due to excessive local load at a narrow region, it will progress in a low energy mode only as far as the first wide region where the double shear failure mode will absorb much greater energy and once started, double shear will continue if the distance between wide spots is not very large with respect to material thickness. On the other hand a uniform weld will continue to fail in a low energy mode.

The problems with the presence of molten metal in forge welding are known in the art. See for example, the reports by H. Haga, K. Aoki and T. Sato entitled "Welding Phenomena and Welding Mechanisms in High-Frequency Electric Resistance Welding Study on ERW" and "The Mechanism of Formation of Weld Defects in High-Frequency Welding Study on ERW" which were presented at the 1979 annual meeting of the American Welding Society. Generally speaking, if the operating conditions are not proper, a weld which is non-uniform or has gaps and which is considered to be a defective weld is produced.

On the other hand, a fluid impervious weld between the tubing and the strip of a solar panel element is not necessary and irregularities in the weld, without actual gaps, do not significantly affect the conduction of heat from the strip to the tubing. However, a weld between the tubing and the strip of a solar panel element which varies in strength longitudinally of the tubing is desirable since such a weld will limit crack propagation so that even when small cracks are produced in the weld metal under thermal stress, the thermal efficiency of the element is not reduced significantly as compared to the case where the weld is substantially uniform and cracks can propagate by reason of the "zipper" effect.

One object of the invention is to provide a heat exchanger element, comprising metal tubing welded to a metal strip by high frequency electric welding techniques, which is not subject to a significant reduction in the efficiency of the transfer of heat from the strip to the tubing when the element is subjected to thermal stresses. A further object of the invention is to provide a process for producing such heat exchanger elements at a relatively high speed without requiring interruption of the electric current which produces the heating of the tubing and the strip.

In accordance with the invention, metal tubing and metal strip are advanced in spaced relation to a weld point where the tubing and the strip are pressed together. In advance of the weld point, high frequency electric current is supplied to the tubing and the strip, the current frequency being at least 3000 Hz and preferably, greater than 50 KHz, to cause the surfaces of the tubing and the strip which face each other to become heated. The angle at which the tubing and the strip approach each other as they advance to the weld point, the power level, the speed of an advance and the atmosphere at the weld point are selected with relation to the metals of the tubing and the strip so that the metal of at least one of the tubing and the strip melts at, or shortly in advance of, the weld point. Under such conditions, the molten metal collects at the apex of the V-gap, the contour of the molten metal being determined by the surface tension of the oxides on its surface and the magnetic forces present. The mass of molten metal builds up in a meniscus until surface tension can no longer contain it, at which time, molten metal is ejected in the form of spray or spume. A new meniscus of molten metal starts to form immediately, and the effect repeats. Prior to the ejection of the molten metal a strong cast weld is produced between the tubing and the strip, but between the ejection of the molten metal and the formation of a new meniscus thereof, a relatively weak weld is produced between the tubing and the strip. Thus, the weld varies in strength longitudinally thereof, and the number of strong welds per inch separated by relatively weak welds can be controlled by adjusting the operating parameters. The number of strong welds may, for example, be in the range of two to two hundred per inch.

Other objects and advantages of the present invention will be apparent from the following detailed description of the presently preferred embodiments thereof, which description should be considered in conjunction with the accompanying drawings in which:

FIG. 1 is a diagrammatic, side elevation view illustrating the welding of metal tubing to a metal strip in accordance with the invention;

FIG. 2 is an enlarged, perspective view of a portion of a heat exchange element after welding of the tubing to the strip;

FIG. 3 is an enlarged, diagrammatic, longitudinal cross-sectional view of a weld between tubing and strip of the same metal which is produced in accordance with the invention;

FIG. 4 is a drawn reproduction of a photo-micrograph of a portion of a weld between a copper tube and a copper strip which was produced in accordance with the invention;

FIG. 5 is similar to FIG. 3 but illustrates a weld between tubing and strip of different metals which is produced in accordance with the invention; and FIG. 6 is a drawn reproduction of a photo-micrograph of a portion of a weld between a copper tube and an aluminum strip which was produced in accordance with the invention.

The invention may be used in connection with heat exchanger elements having various combinations of tube metal and strip metal. For example, the combinations may be as follows:

| TUBE | STRIP |
| --- | --- |
| copper | copper |
| copper | aluminum |
| copper | carbon steel |
| carbon steel | carbon steel |
| carbon steel | copper |
| stainless steel | stainless steel |
| stainless steel | steel |
| aluminum | aluminum |
| aluminum | steel |

FIG. 1 illustrates diagrammatically and in side elevation the welding of a tube 1 to a strip or sheet 2 by supplying high frequency, electric current, e.g. having a frequency of at least 3000 Hz and preferably, between 40 Khz and 500 Khz, to a pair of contacts 3 and 4, the contact 3 engaging the tube 1 and the contact 4 engaging the strip 2. The tube 1 and the strip 2 are advanced longitudinally in the direction of the arrow 5 and are pressed together at a weld point W by a pair of rollers 6 and 7, the roller 6 having a peripheral groove which permits the roller 6 to partially embrace the tube 1. Current flows on the facing surfaces of the tube 1 and the strip 2, due to the proximity effect, to and from the contacts 3 and 4. The principal path of the current on the surface of the strip 2 is narrow relative to the width of the strip due to the proximity effect between current flowing on the tube 1 and the current at the surface of the strip 2. The tube 1 and the strip 2 approach each other along paths providing a V-shaped gap in advance of the weld point W, and in their passage from the contacts 3 and 4 to the weld point W, the tube 1 and the strip 2 are heated due to the current flow therein. After the tube 1 and the strip 2 leave the nip of the rollers 6 and 7, they cool, or are cooled by a cooling fluid, and the tube 1 and the strip 2 have a substantially continuous weld therebetween which is formed by heated and cooled metal of the tube 1 and the strip 2.

As indicated in FIG. 2, the strip 2 is wide relative to the largest cross-sectional dimension of the tube 1, and the tube 1 preferably has a cross-section in the shape of an inverted teardrop so as to aid in concentrating the current along narrow paths in both the tube 1 and the strip 2. The tube 1 may, for example, have a diameter of $\frac{3}{8}$ to $\frac{1}{2}$ inch prior to shaping, and the strip 2 may have a width of four to eight inches and a thickness in the range of 0.010 to 0.020 inches. Of course, the tube 1 and the strip 2 may have other dimensions, but the strip 2 will normally have a width several times, e.g. at least ten times, the largest cross-sectional dimension of the tube 1 and many times the thickness of the strip 2.

The tube 1 and the strip 2 will be heated rapidly at their faying surfaces to a relatively high, welding temperature whereas portions of the strip 2 outwardly from, that is in directions extending away from, the tube 1 will not be heated to the welding temperature. As a result, the tube 1, the weld metal between the tube 1 and the strip 2 at and adjacent the weld metal shrink in length with respect to the portions of the strip 2 further from the weld metal which causes the formation of random ripples 8 which can be removed as described in the co-pending applications of Wallace C. Rudd entitled "Heat Exchanger Panels and Method of Manufacture," Ser. No. 113,790 and filed Jan. 21, 1980 and of Humfrey N. Udall entitled, "Heat Exchanger Panels and Method of Manufacture," Ser. No. 113,796 and filed Jan. 21, 1980, both of such applications being assigned to the assignee of the present application.

The temperatures which the metal of the faying surfaces of the tube 1 and the strip 2 attain when they reach the weld point W depends on the magnitude and concentration of the current flowing in such surfaces as they advance from the contacts 3 and 4 to the weld point W, the angle 9 between them, the effective resistances of the surfaces, and the speed at which they advance from the contacts 3 and 4 to the weld point W. The magnitude of the current is, of course, adjustable by adjusting the output of the high frequency source. Due to the proximity effect, the concentration of the current is dependent upon the radius of the face of the tube 1 nearest the strip 2, upon the frequency of the current and upon the angle 9 which should be in the range from $1\frac{1}{2}°$ to $8°$. The effective resistances of the surfaces are dependent upon the materials of the tube 1 and the strip 2 and the frequency of the current. The speed of advance is adjustable by varying the speed of the pulling apparatus conventionally used to advance the tube 1 and the strip 2. Thus, with the various metals which may be used for the tube 1 and the strip 2, it is possible to select a current frequency and magnitude, an angle 9, a cross-section of the tube 1 and a speed of advance which will provide various temperatures of the faying surfaces of the tube 1 and the strip as they reach the weld point W. For example, when the tube 1 and the strip 2 are made of the same metal, the operating parameters may be selected so that the temperature is above the melting point of the metal so that molten metal 10 is formed at, or shortly in advance of, the weld point W producing a cast weld.

If the metal of the tube 1 is different from the metal of the strip 2, so that the melting points of the metals are different, the operating parameters may be selected so that one of the metals melts at or before the weld point. Under some conditions, e.g. a relatively small difference between the melting points of the metals, the parameters may be selected so that both metals melt at or before the weld point.

When the operating parameters ae such that metal of the tube 1 or the strip 2 or both is molten, molten metal collects at the apex of the V-gap which is at the weld point W. The shape of the accumulated molten metal depends on the surface tension and the electromagnetic forces present due to the heating current. The surface tension can be greatly affected by surface oxides. The nature of the oxides depends upon the nature of the metals used for the tube 1 and the strip 2 and the atmosphere in which the heating and welding are performed, that is whether the atmosphere is inert or active with respect to the heated metals. With the proper selection of operating conditions for the purposes of the invention, the molten metal will accumulate at the apex of the V-shaped gap until the surface tension is insufficient to contain it, at which time molten metal is ejected in the form of spume because of the magnetic field present. Immediately after the ejection of molten metal, new molten metal accumulates until the effect repeats.

As long as there is molten metal at the weld point W, a relatively strong cast weld is produced. Immediately after the molten metal is ejected a relatively weak weld, and in some cases, a small length without a weld, is produced, but the strength of the weld progressively increases until molten metal is again ejected. Thus, there is a continuous, or substantially continuous, weld between the tube 1 and the strip 2 longitudinally thereof, but the strength of the weld varies in the longitudinal direction. Such longitudinal variation of the weld strength is produced without intentional variation of the magnitude of the current, and the occurence of strong welds separated by weaker welds is close to periodic under stable conditions and may be of the order of 2 to 200 per inch of tube 1 length.

The weld of the invention is distinguishable from welds between the tubing 1 and the strip 2 produced by spot welding or interrupted high frequency current welding in that the latter welds are not substantially continuous, having definite gaps between welded areas, and/or have different shapes. Under magnification, a cross-section of the weld of the invention differs in appearance from other welds. The welding method of the invention has the distinct advantage over other methods in that a large number of strong welds per inch, separated by weaker welds, can be produced at high speed and current interruption is not used.

FIGS. 3 and 4 illustrate the nature of a weld produced in accordance with the invention, FIG. 3 being an enlarged diagrammatic showing of a length of the tubing and strip containing several strong welds separated by weaker welds, and FIG. 4 being a drawing of a single strong weld and adjacent metal which is substantially a photomicrograph at a magnification of 20 times of a weld between a copper tubing ⅜ in. outside diameter and having a 0.030 in. wall and a copper strip 0.016 in. thick and 4½ in. wide. The tubing and the strip were advanced at 200 feet per minute. The tubing was teardrop shaped in cross-section as illustrated in FIG. 2 and the angle 9 was approximately 7°. The current frequency was approximately 450 Khz, and the current magnitude was adjusted to obtain the welds of the invention. The distance between corresponding points on strong welds was approximately 0.05 in. During the welding of the tubing to the strip, a mass 10 (see FIG. 1) of molten metal was visible at the apex of the V-gap and spume was ejected at the apex of the V-gap.

In FIG. 3, the arrow 11 indicates the direction in which the tube 1 and the strip 2 were advanced during the welding of the tube 1 to the strip 2. The areas of strong welds, that is welds most difficult to rupture by pulling the tube 1 and the strip 2 apart, are designated by the reference numeral 12, and it will be noted that the weld metal has a teardrop, or comet, shape with the broader end thereof facing in the direction of advance. Immediately adjacent the broader end of the strong weld area 12, at the short length 13, the weld is significantly weaker, and in some instances and for a short length, the tube 1 may not be actually welded to the strip 2. However, as an examination of the weld proceeds from left to right, as viewed in FIG. 3, the strength of the weld increased progressively from the broader end of an area 12 to the next area 12 at the right of such broader end.

Photomicrographs of a length of the weld between a copper tube 1 and a copper strip 2 which includes several areas 12 confirms the illustration in FIG. 3, and a portion of such a photomicrograph at 20 times magnification is shown in the drawing thereof in FIG. 4.

FIGS. 5 and 6 are similar to FIGS. 3 and 4 except that they illustrate the welding of a copper tube 1 to an aluminum strip 2, the aluminum having a lower melting point than the copper and only the aluminum being melted during the welding. The copper tubing 1 had a ⅜ in. outside diameter and a 0.020 inch wall and the strip 2 was 0.024 in. thick and 4½ in. wide. The tubing and the strip were advanced at 200 feet per minute, the tubing was teardrop shaped as illustrated in FIG. 2 and the angle 9 was approximately 7°. The current frequency was approximately 450 Khz, and the current magnitude was adjusted to obtain the welds of the invention. The distance between corresponding points on strong welds was approximately 0.13 in.

In FIGS. 5 and 6, the strong welds are designated by 12a, and the weakest portions of the welds are designated by 13a. The shape of the welds 12a is essentially the shape of one-half of a teardrop. During the welding, the effects were similar to those observed during the welding of copper tubing 1 to a copper strip 2, such effects being described hereinbefore.

The tests described hereinbefore were conducted in a normal room atmosphere which was at normal room temperature. By using an inert gas surrounding the tubing 1 and the strip 2 from the contacts 3 and 4 to at least the weld point, the production of oxides, and hence, the surface tension on the molten metal, is reduced which will change the number of strong welds, 12, per inch with the other operating conditions remaining the same. The number of strong welds, 12, per inch may also be varied by adjusting the current magnitude, the speed of advance of the tubing 1 and the strip 2 and the angle 9 between the tubing 1 and the strip 2 in advance of the weld point.

The combination of the tubing 1 welded to the strip 2 in accordance with the invention may be processed as described in said U.S. Pat. No. 4,136,272 and said applications Ser. Nos. 113,790 and 113,796 to provide solar panel elements which are joined with headers to form solar panels. The tubing 1 may be welded to the strip 2 and processed in the apparatus described in the copending applications of Robert R. Harriau and Humfrey N. Udall entitled "Methods and Apparatus for the Manufacture of Heat Exchanger Panels," Ser. No. 122,467 and filed Feb. 19, 1980 and of Sidney Roberts entitled "Methods and Apparatus for the Processing of Heat Exchanger, Tube-Strip Elements," Ser. No. 122,468 and filed Feb. 19, 1980, both of which applications are assigned to the assignee of this application.

Under conditions of use, any cracks produced in the weld of a panel element will not, in most cases, propagate beyond the distance between a pair of strong welds 12 or 12a, and therefore, the number of strong welds per inch are, preferably, at least twenty per inch to limit the loss of conductivity to a small value. If cracks occur, a crack will usually start at a weak weld. Accordingly, a panel element of the invention can be used under high thermal stress conditions without a significant loss of efficiency due to damage to the weld between the tubing 1 and the strip 2.

Although preferred embodiments of the present invention have been described and illustrated, it will be apparent to those skilled in the art that various modifications may be made without departing from the principles of the invention.

What is claimed is:

1. A heat exchanger element comprising metal tubing substantially continuously secured along its length to a metal strip which is wide relative to the cross-sectional dimension of said tubing and which is thin relative to its width, said tubing being secured to said strip by metal of at least one of said tubing and said strip which has been melted and cooled to form a cast weld between said tubing and said strip, said cast weld being formed by at least two similarly shaped, continuous and discrete volumes of weld metal per inch of the tubing length, each of which volumes has a first end and an opposite second end, the first end of one volume commencing at the second end of the next adjacent volume and the longitudinal cross-sectional dimension of the weld metal at the first end of a volume being substantially greater than the cross-sectional dimension of the weld metal at the second end of said last-mentioned volume, whereby the strength of the weld at the first end of each volume is substantially greater than the strength of the weld at the second end thereof and at the second end of the next adjacent volume, so that the strength of said weld varies in the longitudinal direction of said tubing at a rate of at least two times per inch of the tubing length and said tubing is secured to said strip by welds of greater strength separated by welds of lesser strength.

2. A heat exchanger element as set forth in claim 1 wherein said weld is formed by metal of both said tubing and said strip which has been melted and cooled to form a cast weld which is at least partly a mixture of metal of said tubing and metal of said strip.

3. A heat exchanger element as set forth in claim 1 or 2 wherein the longitudinal cross-sectional shape of each volume conforms substantially to the shape of a tear drop with the larger end thereof at the first end of a volume.

* * * * *